RUPERTUS & WRIGHT.
Sewing Machine.
No. 97,233.  Patented Nov. 23, 1869.
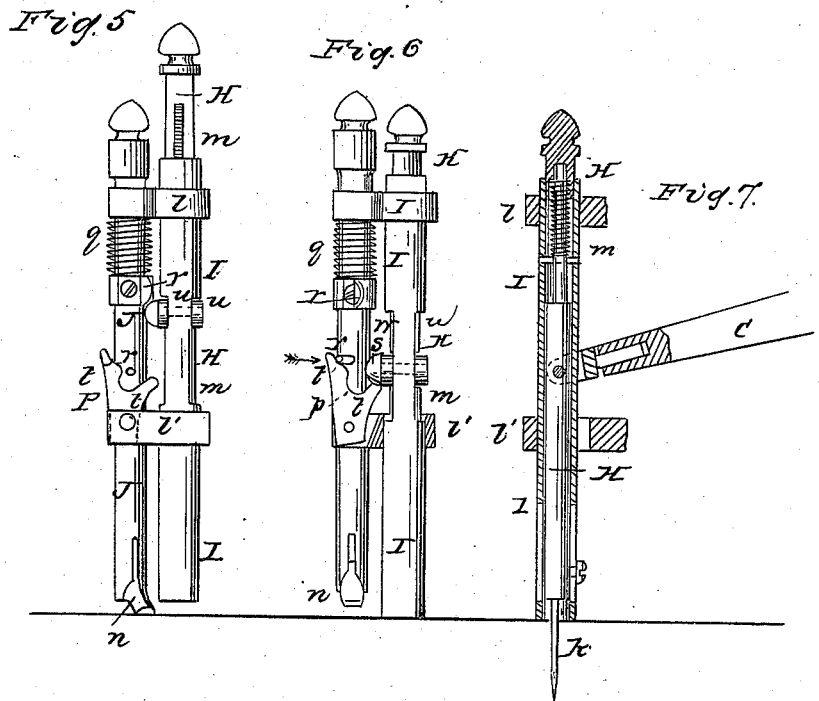
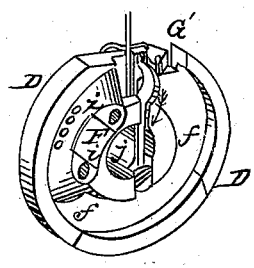
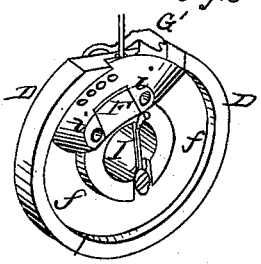
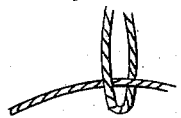
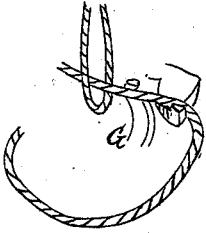
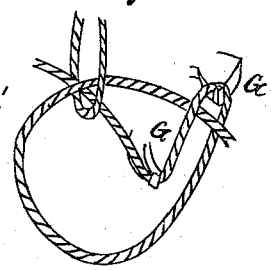

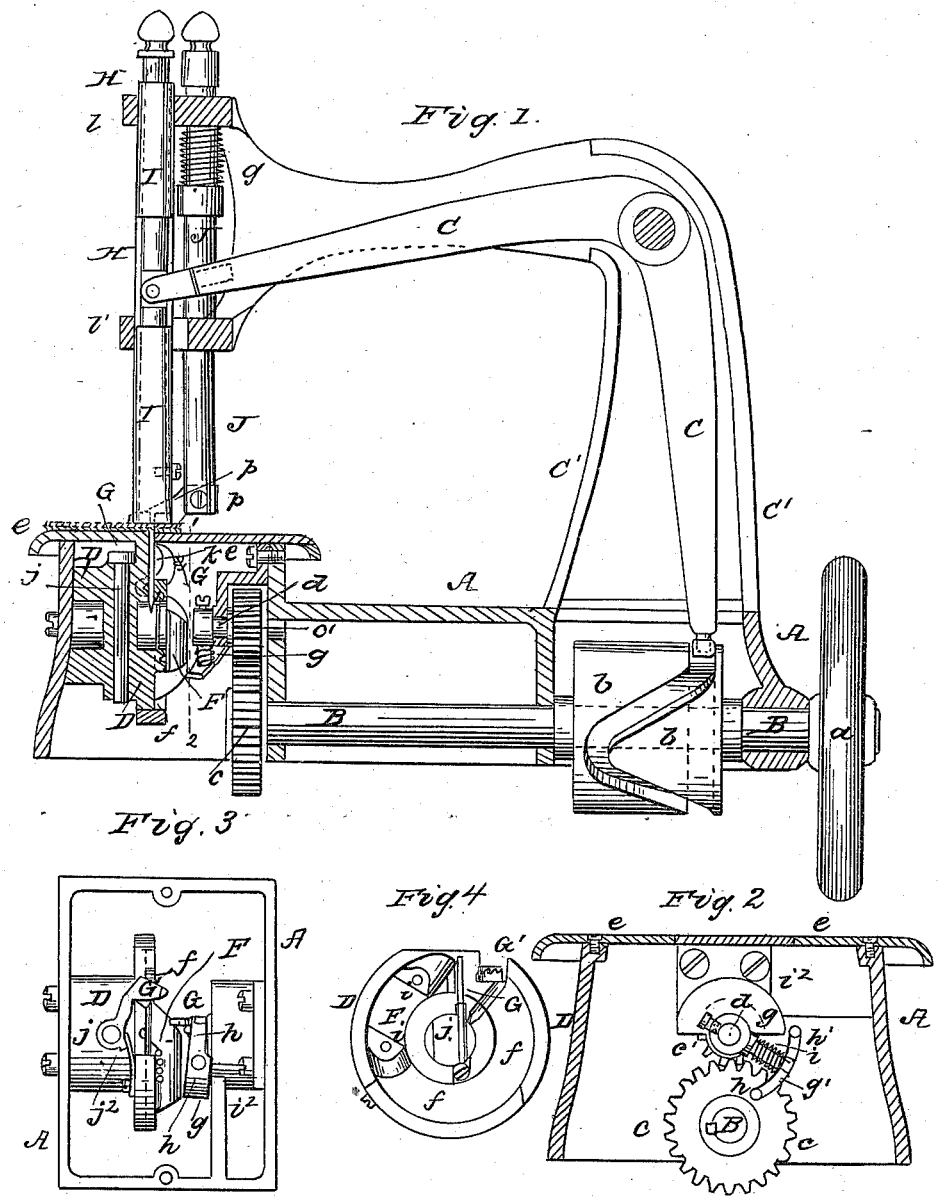

United States Patent Office.

JACOB RUPERTUS AND THOMAS R. WRIGHT, OF PHILADELPHIA, PENNSYLVANIA.

Letters Patent No. 97,233, dated November 23, 1869.

IMPROVEMENT IN SEWING-MACHINES.

The Schedule referred to in these Letters Patent and making part of the same.

We, JACOB RUPERTUS and THOMAS R. WRIGHT, of Philadelphia, county of Philadelphia, State of Pennsylvania, have invented certain Improvements in Sewing-Machines, of which the following is a specification.

Nature and Objects of the Invention.

Our invention consists of a sewing-machine, in which, by a double revolution of the shuttle for every descent of the needle, we are enabled to knot the shuttle and needle-threads together, as hereafter described.

Also, of a novel shuttle-driver.

Also, of a tubular needle-guard, which receives and protects the needle when it is raised above the work-plate.

Our invention further consists of a certain combination for operating the feed and presser-foot, and of other improvements fully explained hereafter.

Description of the Accompanying Drawings.

Figure 1, Sheet 1, is a vertical section of our improved sewing-machine;

Figure 2, a transverse section on the line 1–2, fig. 1, looking in the direction of the arrow;

Figure 3, a plan view of the front portion of the machine, with the work-plate removed;

Figure 4, a face view of the circular shuttle-race and shuttle;

Figures 5 and 6, Sheet 2, front views in different positions of the needle-bar, presser-foot, and feed-motion;

Figure 7, a sectional view, representing the needle-bar and its guard;

Figures 8 and 9, perspective views of the shuttle-race and shuttle; and

Figures 10, 11, 12, and 13, views illustrating the method of forming the stitch.

General Description.

A represents the bed-plate of the machine, in suitable bearings, in which turns the driving-shaft B, the latter having the usual fly-wheel or driving-pulley $a$, and a cam-wheel, $b$, by which motion is communicated to an arm, C, hung to and arranged to vibrate on the stationary arm C'.

At the front end of the driving-shaft is a cog-wheel, $c$, having twice as many teeth as there are in the pinion $c'$, into which the said wheel gears, the spindle $d$, of the pinion, consequently turning twice for every revolution of the driving-shaft.

The circular shuttle-race $f$ is formed in a block, D, which is so secured to the bed-plate, beneath the work-plate $e$, that the centre of the shuttle-race shall coincide with that of the spindle $d$.

The shuttle-driver is secured to the end of the spindle $d$, and consists of an arm, $g$, to the outer end of which is pivoted a curved plate, $g'$, the latter having two pins, $h$ and $h'$, which are adapted to holes $i\ i$, formed in the shuttle F.

As it is necessary, in order to permit the passage of the loop of needle-thread around the shuttle, that these driving-pins, $h$ and $h'$, should be alternately withdrawn from and caused to enter the holes in the shuttle, the plate $g'$ has a vibrating motion imparted to it as it revolves with the spindle $d$.

This vibrating motion is effected by means of a spring, $i^1$, on the arm $g$, and a projection, $i^2$, on the bed-plate, figs. 2 and 3, the spring, which is attached to the plate $g'$, tending to so turn the latter as to cause its pin, $h$, to enter one of the holes in the shuttle, while the projection $i^2$, during a portion of the revolution, bears against the opposite end of the plate, and causes its other pin, $h'$, to be held against the shuttle.

A curved arm, G, hooked at its outer end, is hung to the block D, in a vertical position, and directly in the path of the shuttle, so that on the forward motion of the latter it shall be turned both outward and downward, as indicated by the arrows, figs. 1 and 8; and the said arm is so actuated by a spring, $j$, that after the passage of the shuttle, it shall be restored to its original vertical position.

Directly in advance of this arm G is a horizontal arm, G', hung to the block D, by a pin, $j^1$, actuated by a spring, $j^2$, and having a hooked end, which also projects into the shuttle-race, and is arranged to be pushed back by the nose of the shuttle, as clearly shown in figs. 3, 8, and 9.

The needle-bar H, to the lower end of which is attached the eye-pointed needle $k$, and which is operated in the usual manner by the arm C', is surrounded by a tube, I, which is arranged to slide in projections $l$ and $l'$, on the stationary arm, and which is held down upon the work-plate by a spiral spring, $m$, fig. 7.

This needle-tube has on each side a slot, $m'$, figs. 5 and 6, which permits the free motion of the end of the arm C and of the needle-bar, as will be hereafter described.

The presser-foot $n$, which also serves to feed the work, as hereafter explained, is secured to the lower end of a rod, J, by a screw, $p$, in such a manner that it can be readily adjusted to any required angle, and the rod J, which is arranged to slide on the guides $l\ l'$, of the arm C', parallel to the needle-bar, is acted upon by a spring, $q$, which holds the presser-foot down to the work-plate.

On the rod J, beneath the spring $q$, is a curved lug, r, and on the same side of the rod, beneath this lug, a projecting pin, r'.

The lug r is arranged to be struck and turned by a lug, s, on the end of the arm C, on the ascent of the latter, while the pin r' is operated through the medium of a forked arm, P, which is also struck by the lug s, in such a manner as to both raise and turn the rod J.

Operation.

Motion imparted to the driving-shaft B, is transmitted, through the mechanism described, to the needle-bar, to which the usual reciprocating motion is imparted, and to the shuttle F, which makes two complete revolutions in the direction of its arrow for every descent of the needle.

When the needle reaches the descent of its downward movement, the shuttle passes through its loop of thread, x, as seen in fig. 10, then strikes and turns the hooks G and G', successively, as illustrated in fig. 9, completes its revolution, and again passes through the loop of needle-thread, the hooks G and G', after the passage of the shuttle, springing back to their original positions, one on each side of the shuttle-thread y, as shown in fig. 11.

On the second passage of the shuttle through the loop of needle-thread, it passes over and crosses its own thread, as seen in fig. 12, and then strikes and turns the hooks G and G' as before, the latter carrying with them a portion of the shuttle-thread, and so adjusting and retaining the same as to form a loop, through which the nose of the shuttle passes, this completing the stitch and forming the desired knot in the shuttle-thread.

The loop of shuttle-thread is released from the hooks by the springing back of the latter, and the knot is completed and drawn tight, as shown in fig. 13, on the upward motion of the needle and its loop, the succeeding stitches being formed in the same manner on every descent of the needle and double revolution of the shuttle.

The object of the tube or guard I is to protect and prevent the accidental breaking of the needle, when it has been raised above the work-plate e, this guard receiving the needle, and remaining in contact with the work, as shown in figs. 6 and 7, until the needle-bar has nearly completed its upward movement, the arm C then striking the shoulders u u, of the guard, and raising the same slightly, as seen in fig. 5, in order to permit the proper feeding of the work, prior to forming another stitch.

The foot n, of the bar J, is turned laterally to an extent sufficient to effect a proper feeding of the work by means of the lug s, of the arm C, which, in its upward movement, strikes and turns the lug r, of the said bar J.

On the descent of the arm C, the foot n is raised and turned laterally to its former position, prior to a fresh feeding of the work, by means of the lug s, forked arm P, and pin r', these parts operating in the following manner:

The lug s strikes and depresses the fork t, of the arm P, turning the other fork in the direction of the arrow, fig. 6, so that its bevelled face t' shall be brought against the pin r', the latter being thus gradually turned and lifted until the foot n has been brought to the required position shown in fig. 6.

Claims.

1. A sewing-machine, in which the shuttle is caused by the mechanism herein described, or any equivalent to the same, to pass twice through the loop of needle-thread, and once through a loop of its own thread, during one complete movement of the needle, all substantially as set forth 2. The combination of the cog-wheels c c', proportioned and operating as described, with the shuttle travelling in a vertical annular race, as specified.

3. The hooked arms G and G', acted on by suitable springs, and so arranged in the path of the shuttle, that they shall be turned and operated by the same, substantially in the manner described.

4. The plate g', having projections h h', and travelling in a circle, operating in combination with a shuttle, F, having openings i i, and travelling in an annular race, substantially as described.

5. The tubular slotted guard I, enclosing the needle-bar, and constructed and operated by the arm C and spring m, as described.

6. The spring-rod J, having a vertical and a turning motion, in combination with the lugs s and r, and the arm C, and operating as described.

7. The combination of the lugs s, arm P, and pin r', of the spring-rod J, when the whole are arranged for joint operation, substantially as herein set forth.

In testimony whereof, we have signed our names to this specification, in the presence of two subscribing witnesses.

JACOB RUPERTUS.
T. R. WRIGHT.

Witnesses:
JOHN WHITE,
LOUIS BOSWELL.